Figure 6:
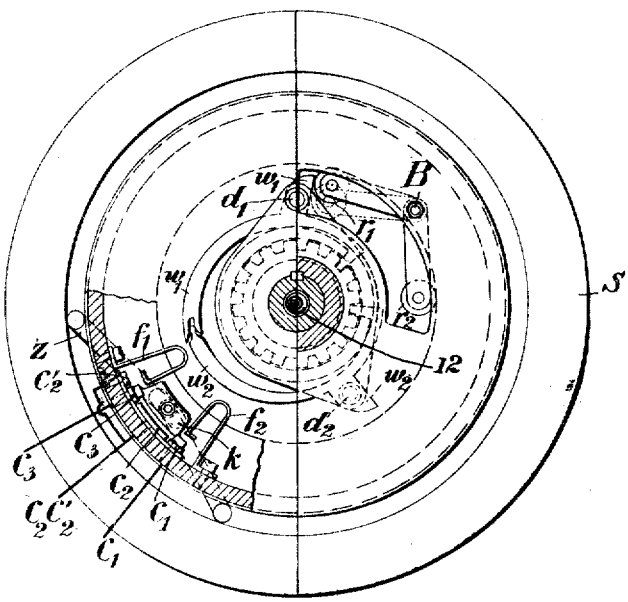

F. R. VON MERKL.
METHOD AND DEVICE FOR ELECTRICALLY REGULATING THE SPEED OF PRIME MOVERS,
ESPECIALLY TURBINES.
APPLICATION FILED JAN. 31, 1908.
908,474.
Patented Jan. 5, 1909.
4 SHEETS—SHEET 1.
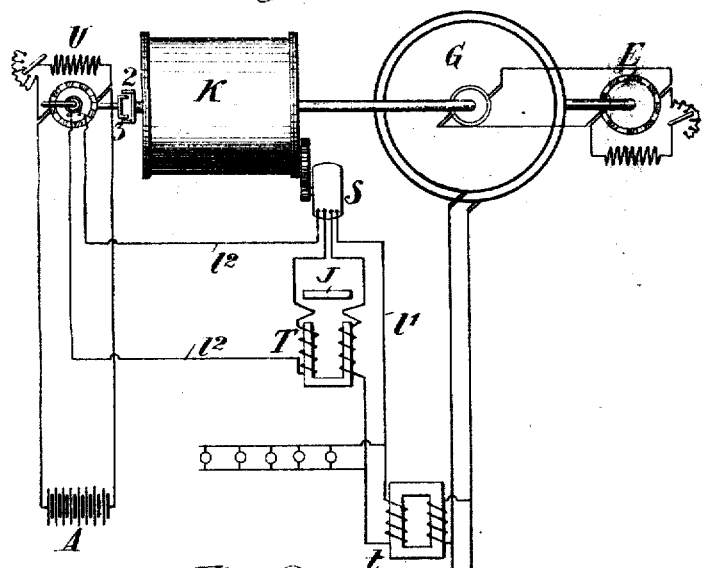
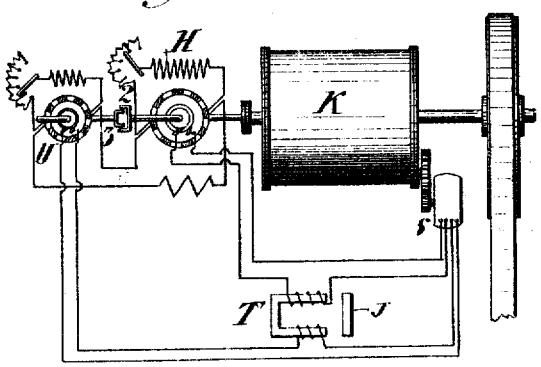
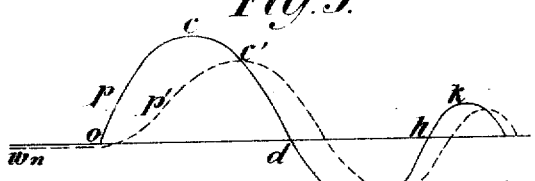

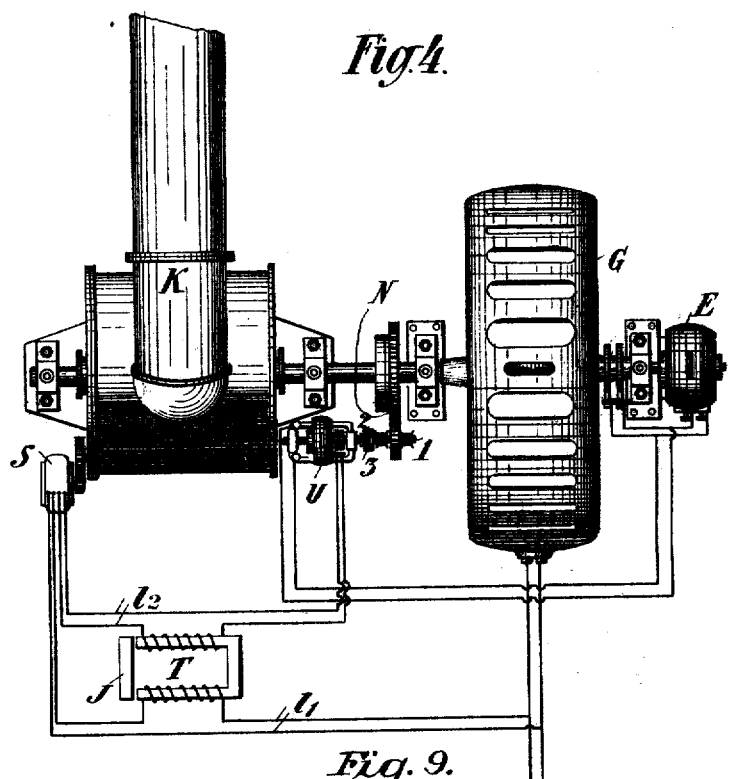
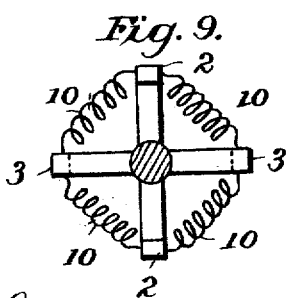

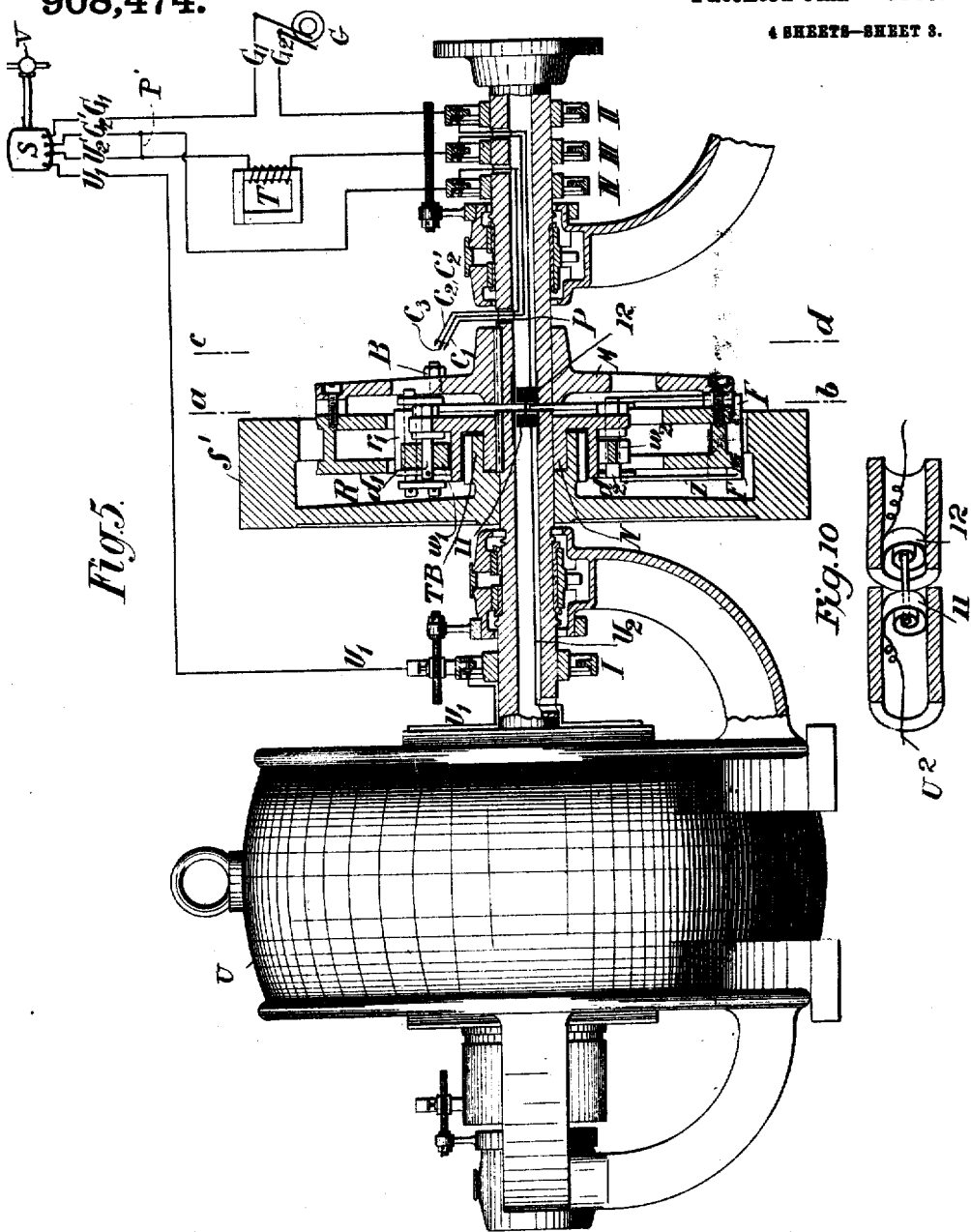

F. R. VON MERKL.
METHOD AND DEVICE FOR ELECTRICALLY REGULATING THE SPEED OF PRIME MOVERS,
ESPECIALLY TURBINES.
APPLICATION FILED JAN. 31, 1908.

908,474.

Patented Jan. 5, 1909.

4 SHEETS—SHEET 4.

UNITED STATES PATENT OFFICE.

FRIEDRICH VON MERKL, OF VIENNA, AUSTRIA-HUNGARY.

METHOD AND DEVICE FOR ELECTRICALLY REGULATING THE SPEED OF PRIME MOVERS, ESPECIALLY TURBINES.

No. 908,474.   Specification of Letters Patent.   Patented Jan. 5, 1909.

Application filed January 31, 1908. Serial No. 413,680.

*To all whom it may concern:*

Be it known that I, FRIEDRICH RITTER VON MERKL, engineer, a subject of the Emperor of Austria-Hungary, and a resident of Vienna, in the Empire of Austria-Hungary, IV. Schikanedergasse 6, have invented a new and useful Improvement of Methods and Devices for Electrically Regulating the Speed of Prime Movers, especially Turbines; and I do hereby declare the following to be a full, clear, and exact description of the invention, such as will enable others skilled in the art to which it appertains to make and use the same.

This invention relates to a method and apparatus for electrically regulating speed and is well adapted for the regulation of prime movers, especially turbines, after the tachometric principle.

The object of the invention is to provide an efficient method and apparatus of the character described.

In carrying out the invention there may be employed a regulating mechanism controlled by a controlling motor adapted to be operated by a plurality of single phase alternating currents differing in phase, one of said currents bearing a fixed phase relation to the prime mover or other apparatus the speed of which is to be governed, while another of said currents may vary in phase with relation to the governed apparatus. Upon a variation in speed of the governed apparatus, the currents will be displaced in phase and a rotary field will be produced in the controlling motor which may be of the usual induction type, and that motor will start and operate the regulating mechanism. The direction in which the motor operates will depend upon which one of the currents leads in phase. If the governed apparatus speeds up the current fixed in phase with relation to that apparatus will lead the other and the motor will rotate in a direction to operate the regulating mechanism to reduce the speed. If the speed of the governed apparatus falls the current fixed in phase with relation to it will fall behind and an opposite rotation of field in the motor will be produced and the motor will run in the opposite direction and the regulating mechanism will be oppositely operated. When the single phase current are in phase, no starting torque will be produced in the controlling motor and therefore if it is at rest it will not move and the regulating mechanism will not be disturbed. If, however, the controlling motor has been set in operation it might continue to operate as a single phase motor when the currents are in phase which is the condition for non-operation of the motor. To prevent this choking coils may be placed in the circuits supplying the motor and these coils may be magnetically interlinked so that when the currents are in phase the reactance of the coils will choke back all but the magnetizing-currents but when the currents are displaced in phase sufficient current may pass to operate the motor. This arrangement will operate, when the currents are in phase, to reduce the supply of energy and increase the slip so that the motor will not operate. The choking coils also reduce the heating of the motor when not operating, by permitting the magnetizing currents only to flow. A resistance may also be included in the rotor in the well known manner. This will operate to increase the slip and will also increase the starting torque when the motor is supplied with currents of displaced phase.

Figure 7:
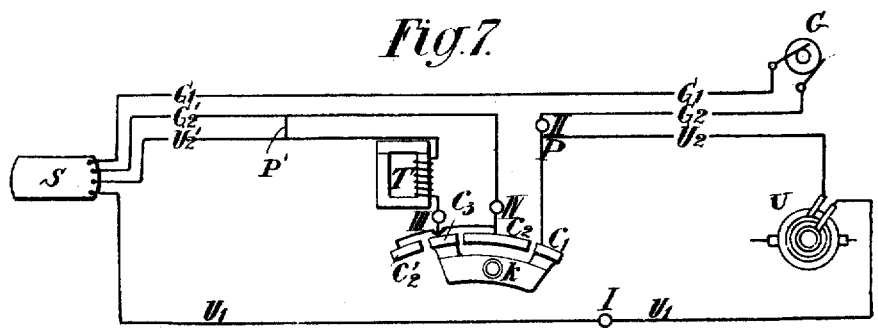
Figure 8:
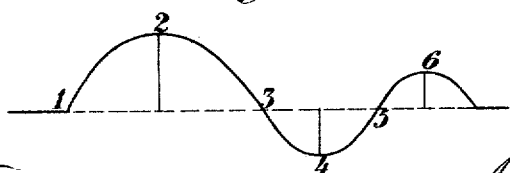

In the accompanying drawings, which illustrate the invention, Figure 1 is a diagram showing apparatus and connections for accomplishing regulation according to the invention; Fig. 2 is a diagram showing a modified form of apparatus and connections; Fig. 3 show curves graphically illustrating the relative speeds, and therefore the relative phases, during the operation of regulation, of different parts of the apparatus, the curves being plotted with speeds as ordinates and times as abscissæ, the horizontal line representing the speed which it is desired to maintain; Fig. 4 is a top plan view of apparatus similar to that shown in Fig. 1, but modified in certain particulars, the electrical connections being diagrammatically shown; Fig. 5 is a view of a modification of the invention, the apparatus including a device for damping the oscillations caused by regulation, a central longitudinal section of the device referred to being shown; Fig. 6 is a section on the line *c—d* of Fig. 5, the parts being broken away to show a partial section on the line *a—b;* Fig. 7 is a diagram showing electrical connections of the device for damping the oscillations; Fig. 8 is a curve plotted with times as abscissæ and the speed of the prime mover as ordinates, the straight line representing the speed desired, and, Fig. 9 is an enlarged view of an elastic connection hereinafter referred to; Fig. 10 is a conventional illustration showing the manner of establishing electrical connection between two revolving shafts by means of spiral springs connected at their centers as hereinafter referred to.

Referring to the drawings, and first to Fig. 1, K is a turbine direct connected to an alternator G the field of which is excited by a direct current exciter E. A phase of the alternator is connected by a transformer $t$ with a circuit $l'$ connected to one phase winding of the controlling motor i. e. the two-phase induction motor S. One side of the circuit $l'$ passes through one section of the induction or choking coil T. The phase of the current thus supplied to the controlling motor, it will be seen, is fixed with relation to the turbine. The motor S operates any suitable regulating mechanism for the turbine such as a valve, for controlling the supply of motive fluid thereto. The other phase winding of the motor S is connected with a circuit $l^2$ which is supplied with alternating current by the direct-alternating rotary converter U. The converter U is driven from a current source of constant voltage such as a storage battery A. One side of the circuit $l^2$ passes through one section of the induction coil T and is mounted on the same core with the section in the circuit $l'$. The two sections are wound so that their magnetomotive forces are coincident and the currents in the circuits $l'$ and $l^2$ choked down to the magnetizing current when the currents are in phase, current being permitted to flow to operate the motor S, when the phases are displaced. A magnetic piece J forms a magnetic yoke for the core of the induction coil T, the reluctance of the magnetic circuit depending upon the distance away from the core at which the yoke is placed.

Gearing projections 2 are secured to the turbine shaft and similar projections 3 extend from the shaft of the converter U. The projections 2 and 3 are adapted to abut to couple the two shafts together and are connected by springs 10 which tend to hold these projections at right angles to each other as shown in Fig. 9 and the projections are so held when the converter U and the turbine, with its connected generator G, are running at the same speed, when the two currents supplied to the motor S will be in phase and the motor and its connected regulating mechanism will be at rest. It will be seen, however, that the elastic connection or coupling just described permits the phase of the alternating current supplied by the converter U to the motor S to vary with relation to that of the turbine and the current having its phase fixed with relation thereto.

The converter U and the source A are so adjusted that the converter tends to run at a constant speed equal to that of the turbine which it is desired to maintain.

Assuming that the turbine is running at the desired speed and the converter is driven at that speed by the storage battery the speed of both being then represented by the straight line W$n$ of Fig. 3. If now at the point $o$ the speed of the turbine varies, as indicated by the full line $p$, the converter will be dragged into variation from that speed, as indicated by the dotted line $p'$. The variation of the converter will, however, lag behind that of the turbine as shown by the relation of the dotted and full lines $p'$ and $p$, this being permitted by the flexible coupling, and the currents supplied to the motor S will be out of phase and the motor will start and operate the regulating mechanism to oppose the variation in speed. The variation will continue until a maximum at the point $c$ is reached when it will decrease and at a point $c'$ the speeds of the converter and turbine will be the same and the two currents supplied to the motor S will be in phase, which is the condition for that motor to stop. Beyond the point $c'$ the variation of the speed of the turbine decreases as indicated by the full line $p$ and the variation of the speed of the converter also decreases as indicated by the dotted line $p'$. In this decrease, however, it will be seen that beyond the point $c'$ the sequence of the phases of the currents is reversed to what it was prior to the point $c'$, in other words, the phase previously leading is now lagging. This results in the reversal of the direction of rotation of the magnetic field in the motor S and consequently that motor and the regulating mechanism are operated in the opposite direction to that prevailing during the increase of the speed variation. It will thus be seen, that the regulating mechanism is not only stopped but begins to act in the opposite direction before the speed of the turbine has reached normal as indicated by the point $d$ upon the curve $p$. As is well known, in devices of this character there is over regulation so that after the speed has been brought from variation upon one side to the normal it will swing to the other side. Thus the speed of the turbine after having been brought from a maximum variation at the point $c$ to the normal at $d$, will continue past the point $d$ to a maximum variation at the point $g$ upon the other side. Throughout the variation from the point $c'$ (before the speed of the turbine reaches the normal) to the point $g'$, the regulating mechanism will be operated to oppose the variation and, therefore, the amplitude of the variation whose maximum is $g$ will be much less than the amplitude of the preceding variation upon the other side of the normal whose maximum is at $c$. At the point $g'$ the motor will be stopped and reversed in a manner similar to that described with regard to the point $c'$ and the speed of the turbine will vary through the normal indicated by $h$ to a maximum upon the other side, indicated by $h'$. The maximum variation upon the side last referred to is smaller than that of the preceding maximum variation upon the other side and for the same reason that the last maximum variation was smaller than the one which preceded it. It will thus be seen that each succeeding variation from the normal will be less than its preceding one and, therefore, the oscillations of speed about the normal will be quickly damped out.

In Fig. 2, the turbine K, instead of driving a power generator, as in Fig. 1, drives power apparatus which is non-electric in its nature. A generator H is, therefore, coupled to the turbine for the purpose of generating the alternating current of fixed phase (with relation to the turbine) which is supplied to the controlling motor S. This generator H is shown as a double current generator which not only supplies the fixed phase but also supplies direct current for driving the rotary converter U which supplies the variable (with relation to the turbine) phase to the motor S. An elastic coupling, as described in connection with Fig. 1, is interposed between the shaft of the turbine and the converter U. An induction coil T, like that shown in Fig. 1 and for a similar purpose, is provided in Fig. 2. The operation of the apparatus of Fig. 2 is substantially the same as described in connection with Fig. 1.

The apparatus shown in Fig. 4 is like that shown in Fig. 1 except that owing to a difference in the number of poles of the rotary converter U and the generator G a gearing 1 is used to couple the converter with the shaft of the turbine and generator so that the currents of the generator G and of the converter U will have the same periodicity. The gear referred to must be positively driving in its character so that a fixed phase relation is maintained between the shaft of the driven gear and the turbine shaft, and between the driven gear and the converter U is interposed a flexible coupling which may be of the character hereinbefore described.

Where an alternator is driven by the turbine, as in Fig. 1, it is only necessary to design the converter U and its source of energy to supply one-half of the regulating current since it supplies but one phase, the other phase being supplied by the generator.

In a modification of my invention I place a choking coil in circuit with the controlling motor during the period of excessive regulation, which coil is automatically short circuited during the period of useful regulating work. The apparatus illustrated in Figs. 5, 6 and 7 is designed to accomplish this purpose. Referring to these figures, the pulley M is mounted upon and keyed to the turbine shaft and to it is bolted a ring R which extends into a fly wheel S' having a specially shaped rim. The fly wheel S' is mounted upon the shaft of the converter U. The inside of the ring R is furnished with a sliding contact $k$ which is kept in normal position by the springs $f_1$ and $f_2$, this sliding contact serving to connect and disconnect the choking coil T. One end of each of two frames $z$ is pivoted to the contact $k$. The other ends of these frames slide on the inside of the fly wheel rim, there being friction created between the frame ends and the fly wheel rim by centrifugal force. The fly wheel S' is mounted loose upon the shaft of the converter and is coupled with it by means of a detachable coupling which is controlled by the turbine shaft. In case the speed of the turbine varies, either by acceleration or retardation, by an amount equal to one-quarter (90 electrical degrees) of the pole pitch of the converter, the coupling will disconnect and the fly wheel can then rotate loosely on the shaft of the converter (as is hereinafter explained in detail) thereby maintaining a practically constant speed regardless of the speed of the converter which is obliged to follow the turbine shaft in such a manner that the alternating currents maintain a maximum phase displacement during the increase of the speed variation. In the present case the shaft of the converter has keyed to it a flange N which is provided with a sleeve within which extends a toothed boss TB of the fly wheel. Two three-armed levers $w'$ $w^2$ are pivoted in the flange N and two of the arms extend about the sleeve and are geared together as shown in Fig. 6. Two of the arms, one upon each lever, operate as pawls and pass through openings in the sleeve secured to the flange N, and into the teeth of the fly wheel boss thus coupling the fly wheel with the shaft. The other arms of the levers are shaped to serve as bearing surfaces for the fly wheel rollers $r_1$ and $r_2$ which are actuated by the turbine shaft, they being pivoted at B upon the pulley M. The surfaces of the levers $w'$ and $w^2$ are inclined towards the radial direction so as to cause the rollers to slide on these surfaces toward the center, when the pawls will be pressed in the toothed wheel.

In Figs. 5 and 6 the turbine and the converter are to run at the same number of revolutions and, therefore, are arranged coaxially. If, however, the number of poles were different so that the converter and turbine would be required to run at different speeds a positively driving reducing gear would have to be employed.

In order to avoid the use of a sliding contact the conductor $U_2$ of the converter is connected between the converter and turbine shafts by means of the spiral springs 11 and 12 whose centers are connected by a wire as shown most clearly in Figs. 5 and 10.

In the drawings the conductors $G_1$ and $G_2$ on the one hand lead to the generator as G positively driven by a prime mover, and on the other hand the conductors $G_1$ and $G^1_2$ lead to one phase winding of a controlling motor such as S which operates a valve V controlling the prime mover. The conductors $U_1$ and $U_2$ are on the one hand connected with the alternating current side of the rotary converter U and on the other hand the conductors U and $U^1_2$ lead to the other phase winding of a controlling motor such as S. The circuits of the two phases of the controlling motor have a common path through the induction coil T (see Figs. 5 and 7) so that this coil affects both circuits.

Referring more particularly to the electrical connections of the apparatus shown in Figs. 5, 6 and 7, the conductor $G_2$ leading from one terminal of the generator G is connected with the slip ring II which in turn is connected to the point P. Also connected with the point P, through the springs 11 and 12, is the conductor $U_2$ leading from the alternating current side of the converter. From the point P a conductor leads to the contact $c_1$ adapted to be connected by block $k$ with contact $c_2$. The contact $c_2$ is connected to the contact $c'_2$ and the slip ring IV. The ring IV is connected to the junction P' of the wires $U_2$ and $G_2$. From the junction P' the wires $U_2$ and $G_2$ lead to the controlling motor S, one wire being connected to a terminal of each phase. The other terminal of the generator G is connected by a conductor $G_1$ with a terminal of one phase of the motor S. The contact $c_2$ is connected with the slip ring III which is connected with one terminal of the induction coil T, the other terminal of that coil being connected with the junction P'. The conductor U which leads from the alternating current side of the converter to a terminal of one of the phases of the motor S makes its connection through a slip ring I. Although no brushes are shown in connection with slip rings II, III and IV, it will be understood that suitable brushes are employed, for instance, like that shown in connection with ring I. In Fig. 7 the slip rings are designated by small circles as indicated by the reference numerals.

The operation of the device shown in Figs. 5, 6 and 7 is as follows: When starting the apparatus, the converter (if its source of energy is not yet in action) is run by the turbine. Owing to the inclined surfaces of the coupling levers which act against the rollers $r_1$ and $r_2$, these rollers slide toward the center and the pawls enter the toothed wheel. When a certain number of revolutions has been reached the rollers $r_1$ and $r_2$ swing outwardly under the action of centrifugal force and, coming into contact with the arm $w_1$ or $w_2$ of the coupling levers turn those levers upon their pivots whereupon the pawls are removed from the toothed wheel, the fly wheel becoming thus disconnected, when it will rotate loosely on the shaft of the converter without changing its number of revolutions.

During normal speed, the converter is electrically driven so that the converter and turbine shafts run at the same speed and the two phases of current are coincident so that the controlling motor is at rest. Under this condition the pivot point B will be midway between the extremities of the levers $w_1$ and $w_2$. These extremities are a distance apart such that the sum of the distances between the rollers $r_1$ and $r_2$ and the extremities of the levers $w_1$ and $w_2$, respectively, is equal to one-half the pole pitch (180 electrical degrees) of the converter. In the position of the apparatus shown in Fig. 6, the roller $r_1$ is against the lever $w_1$ and therefore the distance between the roller $r_2$ and the lever $w_2$ is equal to one-half the pole pitch of the converter. It will now be apparent that upon acceleration or retardation of the turbine speed from the normal the roller $r_1$ or $r_2$ will come against the arm $w_1$ or $w_2$, as the case may be, after the turbine shaft has turned through 90 electrical degrees, and will disconnect the fly wheel and drive the converter. It will be observed therefore, that while the converter is driven by the turbine the two are displaced 90 electrical degrees in phase and that therefore the currents supplied to the controlling motor are displaced 90° in phase which is the proper relation for operating two phase motors to the best advantage.

The movement of the contact slide $k$ on the rim of the fly wheel is effected by the combined action of the force of the springs $f_1$ and $f_2$, of the friction and of the pressure of its own mass plus the pressure due to the mass of the frames. Upon an increase in the speed of the turbine (as at point 1 in Fig. 8) the spring $f_2$ will be compressed owing to the retardation of the slide $k$ with relation to the ring R. The slide $k$ will then connect the contacts $c'_2$ and $c^2$, thus short circuiting the choking coil T which will result in a great torque in the controlling motor. The pressure upon the spring $f_2$, due to retarding changes at point 2 of Fig. 8 to pressure due to acceleration, thus acting against the friction. The spring $f_2$, which now has only to overcome the difference of the two forces, expands and thereby moves the sliding contact $k$ into its normal position and places the choking coil T in circuit. At point 3 of Fig. 8, the friction, owing to equal speed, is naught. In the next instant, however, it increases together with the accelerating mass which keeps its direction from point 2 to point 4 and compresses the spring $f_1$ thus short circuiting the choking coil T. It will now be seen that during the useful regulating time the friction plus the pressure due to mass is acting on the spring, whereas during excessive regulation the difference of the forces due to friction and mass is acting. At the points 1, 3 and 5 the spring will move the slider $k$ the sooner the more the static friction, in the first instant, preponderates and exceeds the friction of motion. The complete change-over device is arranged in the inside of the ring R so as to insure a proper resting of the frame on the contacts by the centrifugal force. This ring R may be filled with oil which will prevent sparking due to reversing, the oil being maintained within the ring by centrifugal force. The sparking at the contacts will, however, be small as the choking coil will be connected in parallel with any spark which may be formed

What I claim is:—

1. The combination with a rotating body, the speed of which is to be governed, of means for generating an alternating current fixed in phase with relation to said rotating body, a rotating generator for supplying an alternating current variable in phase with relation to said rotating body, speed regulating mechanism for said rotating body, a motor operative by out of phase currents for controlling said regulating mechanism, and means for supplying current in phase with said generator and current in phase with said rotating body respectively to said motor.

2. The combination with a prime mover, speed regulating mechanism for said prime mover, an alternating current generator positively driven by said prime mover, a second alternating current generator, a coupling serving to connect said prime mover and said second alternating current generator, said coupling adapted to permit a change of phase of said second alternating current generator with relation to said prime mover, a motor adapted to be operated by a plurality of out of phase alternating currents, said motor being connected with said generator positively driven by said prime mover and with said second alternating current generator, said motor controlling said regulating mechanism.

3. The combination with a prime mover, of an alternating current generator positively driven thereby, a second alternating current generator, an elastic coupling between said prime mover and said second alternating current generator, regulating mechanism for said prime mover, a motor controlling said regulating mechanism, said motor being adapted to be operated by out of phase alternating currents, said motor being connected with said positively driven alternating current generator and said second alternating current generator.

4. The combination with a prime mover, of an alternating current generator positively driven thereby, a direct current-alternating current converter, a source of direct current for driving said converter, a flexible coupling between said prime mover and said converter, speed regulating mechanism for said prime mover and a motor for controlling said regulating mechanism, said motor being adapted to be operated by out of phase alternating currents and said motor being connected with said alternating current generator and with said converter.

5. The combination with a prime mover, of an alternating current generator positively driven thereby, a source of alternating current, means independent of said prime mover tending to drive said source of alternating current at a constant speed, a coupling serving to mechanically connect said prime mover and said source, said coupling being adapted to permit variation of the phase of said source with relation to said prime mover, speed regulating mechanism for said prime mover, and a motor controlling said regulating mechanism, said motor being adapted to be operated by a plurality of out of phase currents, said motor being connected with said source and with said generator.

6. The combination with a prime mover, of an alternating current generator positively driven thereby, a source of alternating current, means independent of said prime mover tending to drive said source of alternating current at a constant speed, an elastic coupling between said prime mover and said source, speed regulating mechanism for said prime mover, and a motor controlling said regulating mechanism, said motor being adapted to be operated by a plurality of out of phase currents, said motor being connected with said source and with said generator.

7. The method of regulating the speed of prime movers which consists in operating the regulating mechanism of said prime mover to oppose the variation in speed of said prime mover and reversing the operation of the regulating mechanism before the speed of the prime mover has reached the normal.

8. The method of regulating the speed of prime movers which consists in generating alternating electric currents, one of which is fixed in phase with relation to said prime mover and the other is variable in phase with relation thereto, operating the regulating mechanism of said prime mover when said currents are out of phase, to oppose speed variation and changing the sequence of the phases before the speed of the prime mover has reached the normal to damp the oscillation due to regulation.

9. The combination with a prime mover, of an alternating current generator positively driven thereby, a second alternating current generator, a lost motion coupling between said prime mover and said second alternating current generator, regulating mechanism for said prime mover, a motor controlling said regulating mechanism, said motor being adapted to be operated by out of phase alternating currents, said motor being electrically connected with said positively driven alternating current generator and said second generator.

In testimony whereof I have signed my name to this specification in the presence of two subscribing witnesses.

FRIEDRICH VON MERKL.

Witnesses:
FRANZ REITER,
ROBERT W. HEINGARTNER.